Sept. 11, 1923.
C. A. BRUCH
EMBLEM HOLDER
Filed Jan. 7, 1922
1,467,834
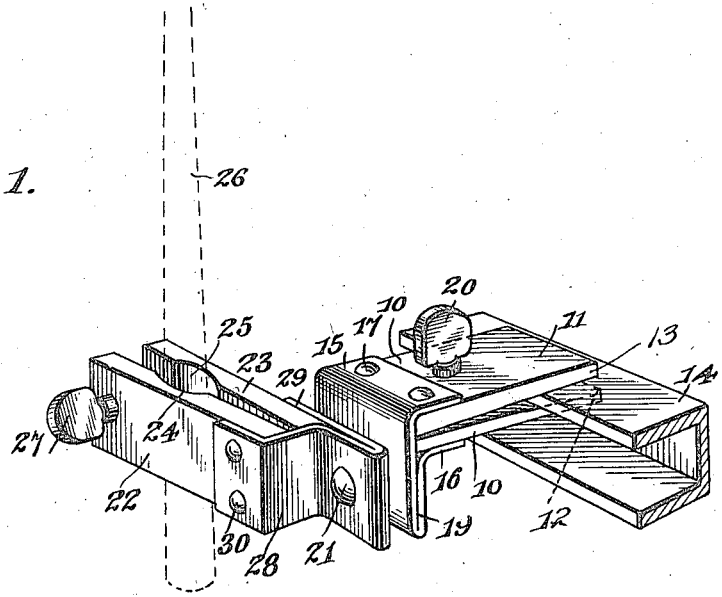
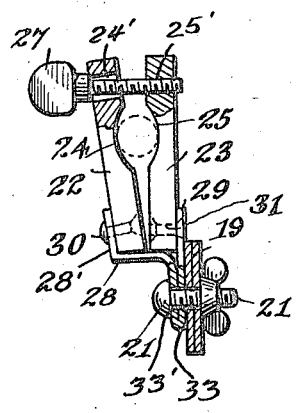
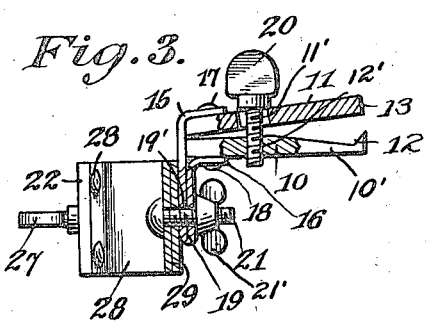
Clement A. Bruch, INVENTOR.
BY Geo. F. Kimmel, ATTORNEY.

Patented Sept. 11, 1923.

1,467,834

UNITED STATES PATENT OFFICE.

CLEMENT A. BRUCH, OF WARRENSBURG, MISSOURI.

EMBLEM HOLDER.

Application filed January 7, 1922. Serial No. 527,654.

*To all whom it may concern:*

Be it known that I, CLEMENT A. BRUCH, a citizen of the United States, residing at Warrensburg, in the county of Johnson and State of Missouri, have invented certain new and useful Improvements in Emblem Holders, of which the following is a specification.

This invention relates to clamping devices, more particularly to clamping devices adapted to support flags or other emblems upon a stationary or movable structure, such as the fenders, mud guards, or other parts of motor driven vehicles, and has for one of its objects to simplify and improve the construction and increase the efficiency and utility of devices of this character.

Another object of the invention is to provide a device of this character in which provision is made for adjusting the staff supporting portion to hold the staff at any required angle.

Another object of the invention is to provide a device of this character in which provision is made for adjusting the clamping portions to structures or parts of varying sizes and forms without material structural change.

With these and other objects in view the invention consists in certain novel features of construction as hereinafter shown and described and then specifically pointed out in the claims, and in the drawings illustrative of the preferred embodiment of the invention:

Figure 1 is a perspective view of the improved device.

Fig. 2 is a plan view partly in section.

Fig. 3 is a side elevation partly in section.

An emblem holder in accordance with this invention includes a pair of co-acting clamping members 10 and 11, the latter arranged over the former and each of said members is rectangular in contour. That face of the member 10 which opposes the member 11, is cut away to provide a seat 10' and a prong 12. The prong 12 opposes the end 13 of the member 11, and the clamping members 10 and 11 are employed to bear against the opposite sides of a support, by way of example, one of the webs 14 of a channel shaped fender member of a motor vehicle, as well as being clamped, in a manner as hereinafter referred to, to said web 14 whereby the device will be secured in position for supporting an emblem. The seat 10' enables a support, not shown, to be mounted thereagainst, and under such conditions the members 10 and 11 will overlap said support. The prong 12 assists in connecting the member 10 to a support, due to the fact that the prong 11 can enter the support, when the members 10 and 11 are in clamping position. The members 10 and 11 are constructed of such material so as to withstand the strains to which they are subjected.

The member 11 is provided with a slot 11' and the member 10 with an opening 12', having the wall thereof threaded. Extending through the slot 11' is a clamping screw 20 having threaded engagement with the wall of the opening 12', and the screw 20 is employed for shifting the members 10 and 11 towards each other to position them in clamping engagement with respect to the web 14 or other support, not shown. The clamping members 10 and 11 are carried by a holder consisting of a body portion 19 having extended therefrom a resilient arm 15, which is angle shaped in contour and the body portion 19 is furthermore provided with a resilient flange or arm 16, which opposes the horizontal leg of the arm 15. Secured to the horizontal leg of the arm 15, by the hold-fast devices 17, is one end of the member 11, and secured to the flange or arm 16, by the hold-fast devices 18, is one end of the member 10. The connected ends of the members 10 and 11 are arranged between the horizontal leg of the arm 15 and the flange 16, and by this arrangement the members 10 and 11 are arranged in superposed relation with respect to each other, and as the horizontal leg of the member 15 is slightly inclined upwardly, the normal position of the member 11 extends from the member 10, as clearly shown in Figure 3. The body portion 19 of the holder is provided with an opening 19' which extends in a plane parallel to the plane of the flange 16, and the said opening 19' is disposed intermediate the sides of the holder 19, preferably centrally thereof, but below the transverse center of the holder 19.

The device further includes an emblem or staff support comprising a pair of rectangular gripping members 22, 23, the former having its inner face provided with a curved seat 24 and the latter having its inner face formed with a curved seat 25. The seats 24, 25 extend transversely of the gripping members 22, 23 and oppose each other. The gripping member 24, near its outer end is provided with a slot 24', and the gripping member 23 in proximity to its outer end, is provided with an opening 25' having the wall thereof threaded. Extending through the slot 24' and threadedly engaging with the walls of the opening 25', is a clamping screw 27 employed for shifting the outer ends of the members 22, 23 together for the purpose of having the seats 24, 25, moving in gripping or clamping engagement with the staff 26, or other emblem.

The emblem or staff support is carried by a resilient holder and the latter comprises a body portion 33, provided with a resilient arm consisting of a laterally disposed leg 28 and a horizontally disposed leg 28', the latter being inclined outwardly with respect to the leg 28. The body portion 33 is also provided with a resilient arm 29, which opposes the horizontal leg 28' of the other resilient arm. The gripping member 22 is positioned against the lateral leg 28 and also against the horizontal leg 28' of the resilient arm, and is furthermore secured to the horizontal leg 28' by the hold-fast devices 30, and owing to the fact that the leg 28' is inclined outwardly, the normal position of the member 22 is at an outward inclination with respect to the member 23. The inner end of the member 23 is secured to the arm 29 by the hold-fast devices 31. By setting up the members 22, 23, in the manner as stated they oppose each other, but normally the member 22 projects outwardly at an inclination with respect to the member 23 and when the screw 27 is actuated to bring the members 22, 23 into gripping or clamping engagement with respect to the staff 26, the member 22 is shifted towards the member 23, whereby the staff 26 will be gripped or clamped to the seats 24, 25, as illustrated in Figure 2 of the drawings.

The holder for the members 22, 23, is adjustably connected to the holder for the clamping members 10 and 11, through the medium of a coupling screw 31, and the latter has its threaded shank extended through an opening 33' in the body portion 33, and also through the opening 19' in the body portion 19. When the holding members are set up in operative position, the opening 33' in the body portion 33 registers with the opening 19' in the body portion 19 and through said registering openings extends the threaded shank of the coupling screw 21. The shank of the coupling screw 21 projects from the body portion 19 and carries a wing-nut 21' which is adapted to be shifted in abutting engagement with respect to the body portion 19 whereby the holding members are coupled or clamped together. When the wing-nut 21' is loosened the holding member 23 can be adjusted to any desired angle position with respect to the body portion 19, after which the wing-nut 21' is screwed home and the holder 33 clamped or secured in the position to which it has been adjusted, or the body portion 19 can be angularly adjusted with respect to the body portion 33 and then clamped in the position to which it has been adjusted.

By setting up the support in the manner as referred to, that is to say, connecting the gripping members 22, 23, together through the medium of the screw 27, means is provided whereby staffs or emblems of different sizes can be secured in position, and this provision is also assisted through the medium of the providing of the body portion 33 with the resilient arms.

The preferred embodiment of the invention is as hereinbefore referred to and illustrated in the drawings, but it will be understood that changes in the detail of construction can be had without departing from the spirit of the invention as claimed.

Having thus described the invention what is claimed as new is:

1. A device for the purpose set forth comprising a pair of holders, each provided with a pair of resilient arms, one of the arms of each pair being angle shaped and having its outer portion opposing the other arm of the pair, a pair of clamping members superposed between and projecting from one pair of said arms, a pair of opposed gripping members extended between and secured to and further projecting from the other of said pair of arms, a shiftable means carried by one and engaging in the other of the clamping members for moving them to clamping position, shiftable means carried by one and engaging in the other of the gripping members for moving them to gripping position, and means for connecting the holders together.

2. A device for the purpose set forth comprising a pair of holders, each provided with a pair of resilient arms, one of the arms of each pair being angle shaped and having its outer portion opposing the other arm of the pair, a pair of clamping members superposed between and projecting from one pair of said arms, a pair of opposed gripping members extended between and secured to and further projecting from the other of said pair of arms, a shiftable means carried by one and engaging in the other of the clamping members for moving them to clamping position, shiftable means carried by one and engaging in the other of the gripping members for moving them to gripping position, means for connecting the holders together, one of said arms of one pair of arms providing means for normally positioning one of said clamping members at an inclination with respect to the other of said clamping members, and one of said arms of the other pair of arms providing means for normally positioning one of said gripping members at an inclination with respect to the other of said gripping members.

In testimony whereof, I affix my signature hereto.

CLEMENT A. BRUCH.